(12) United States Patent
Zhao et al.

(10) Patent No.: US 12,420,359 B2
(45) Date of Patent: Sep. 23, 2025

(54) FIVE-DIMENSIONAL LASER SCANNING PROCESSING DEVICE AND METHOD

(71) Applicant: Xi'an Jiaotong University, Xi'an (CN)

(72) Inventors: Wanqin Zhao, Xi'an (CN); Kailin Li, Xi'an (CN); Xuesong Mei, Xi'an (CN); Bin Liu, Xi'an (CN); Zheng Sun, Xi'an (CN); Wenqiang Duan, Xi'an (CN); Wenjun Wang, Xi'an (CN); Jianlei Cui, Xi'an (CN); Zhengjie Fan, Xi'an (CN)

( * ) Notice: Subject to any disclaimer, the term of this patent is extended or adjusted under 35 U.S.C. 154(b) by 0 days.

(21) Appl. No.: 18/843,212

(22) PCT Filed: Nov. 30, 2023

(86) PCT No.: PCT/CN2023/135455
§ 371 (c)(1),
(2) Date: Aug. 30, 2024

(87) PCT Pub. No.: WO2024/244351
PCT Pub. Date: Dec. 5, 2024

(65) Prior Publication Data
US 2025/0108461 A1    Apr. 3, 2025

(30) Foreign Application Priority Data

May 30, 2023    (CN) .......................... 202310625694.7

(51) Int. Cl.
*B23K 26/70*    (2014.01)
*B23K 26/06*    (2014.01)
*B23K 26/082*    (2014.01)

(52) U.S. Cl.
CPC ........ *B23K 26/702* (2015.10); *B23K 26/0648* (2013.01); *B23K 26/082* (2015.10)

(58) Field of Classification Search
None
See application file for complete search history.

(56) References Cited

FOREIGN PATENT DOCUMENTS

CN    103317233 A    9/2013
CN    108247200 A    7/2018
(Continued)

OTHER PUBLICATIONS

CN 108555464 A (Duan, J) Sep. 21, 2018 [retrieved on Jan. 28, 2025]. Retrieved from Espacenet Database, translation by EPO and Google (Year: 2018).*

(Continued)

*Primary Examiner* — Edward F Landrum
*Assistant Examiner* — Theodore J Evangelista
(74) *Attorney, Agent, or Firm* — Novoclaims Patent Services LLC; Mei Lin Wong

(57) ABSTRACT

The present invention discloses a multi-dimensional laser scanning processing device and method, which includes a horizontally arranged laser beam, a turning optical path module arranged at one end of the laser beam along a horizontal direction. The turning optical path module is used to deflect the laser beam by 90°, which is then arranged to enter a deflection module. The deflection module is used to deflect the laser beam by 90° again so that it enters the beam expansion module along the horizontal direction. The beam expansion module 4 is arranged to expand a beam radius of the laser beam to a certain multiple, which then enters the plane scanning module, and finally enters the focusing module to converge into an ideal spot. The present invention can realize the changes of focused laser beam in the XYZ space and the two inclination angles α and β of the optical axis.

10 Claims, 3 Drawing Sheets

(56) References Cited

FOREIGN PATENT DOCUMENTS

| | | | | |
|---|---|---|---|---|
| CN | 207656080 U | | 7/2018 | |
| CN | 108555464 A | * | 9/2018 | ............ B23K 26/00 |
| CN | 208391288 U | | 1/2019 | |
| CN | 114393313 A | | 4/2022 | |
| CN | 115055844 A | * | 9/2022 | |
| KR | 10-2018-0137071 A | | 12/2018 | |

OTHER PUBLICATIONS

CN 115055844 A (Li, F) Sep. 16, 2022 [retrieved on Jan. 28, 2025]. Retrieved from Foreign Image and Text database, translation by Clarivate Analytics (Year: 2022).*

* cited by examiner

FIVE-DIMENSIONAL LASER SCANNING PROCESSING DEVICE AND METHOD

BACKGROUND OF THE PRESENT INVENTION

Field of Invention

The present invention relates to the field of laser processing technology, in particularly related to a five-dimensional laser scanning processing device and method.

Description of Related Arts

The five-dimensional laser scanning processing device uses its own optical electromechanical equipment to realize multi-dimensional changes of light beams in space and obtain complex spatial light trajectories.

Traditional laser processing equipment usually needs to form a multi-axis laser processing system with robotic arms, CNC machine tools, etc. to complete the efficient and precise processing of certain complex parts. Although this method can process some complex parts, it mainly relies on the multi-axis motion capabilities of CNC machine tools. During the processing process, the error of the multi-axis motion of the machine tool limits the processing accuracy and quality, the machine tool processing speed is slow and the continuous start and stop causes the wear error which affects the high speed and high efficiency of the original laser processing technology.

SUMMARY OF THE PRESENT INVENTION

In order to solve the above technological problems, an object of the present invention is to provide a five-dimensional laser scanning processing device and method that is capable of realizing the change of light beam in a XYZ plane and two inclination angles α and β, where the inclination angle α refers to the state in which the angle between the focused beam and the optical axis diverges outward, and the inclination angle α refers to the state in which the angle between the focused beam and the optical axis converges inward.

In order to achieve the above objects, the technical solution adopted by the present invention is:
  a five-dimensional laser scanning processing device, which comprises a laser emitting device, a beam expansion module 4, a plane scanning module 6 and a focusing module 5. The laser emitting device is used to emit a laser beam 1, and the beam expansion module 4 is used to expand the beam radius of the laser beam 1. After beam expansion, it is more conducive to laser focusing, converging the light spot into a smaller size, and it is also easier to reduce aberrations. Then the laser beam enters the plane scanning module 6. The plane scanning module 6 is composed of two reflective mirrors at a certain angle. Through the continuous deflection of the two reflective mirrors, the scanning of the laser beam in the XY plane is achieved. After passing through the plane scanning module 6, the laser beam finally enters the focusing module 5 and converges into an ideal spot (with a spot diameter about 20 μm).

A turning optical path module 2 is arranged at one end of laser beam 1 along a horizontal direction. The turning optical path module 2 is used to deflect the laser beam 1 by 90° before entering a deflection module 3. The deflection module 3 is used to deflect the laser beam 1 by 90° again so that it enters the beam expansion module 4 along the horizontal direction.

The laser beam 1 enters an interior of an enclosed housing 7 along the horizontal direction through a light hole on the housing 7. The turning optical path module 2, the deflection module 3, the beam expansion module 4, the focusing module 5, and the plane scanning module 6 are installed inside the housing 7.

The change of the laser beam 1 in the five-dimensional space is jointly determined by the turning optical path module 2, the deflection module 3, the beam expansion module 4, the focusing module 5, and the plane scanning module 6, wherein the scanning of the XY plane is mainly caused by the movement of the plane scanning module 6. The movement of a focus of the Z plane is mainly caused by the joint action of the beam expansion module 4 and the focusing module 5. The regulation of the angles α and β between the focused beam and the optical axis is caused by the combined movement of multiple modules.

The turning optical path module 2 comprises a lens housing and a reflective lens, wherein the reflective lens is placed at an angle of 45° to the horizontally entering laser beam 1. The lens housing not only can install the reflective lens, but also has the function of adjusting the reflective lens by +2°, so the lens after installation can reflect the light beam and make it vertically incident on the deflection module 3.

The deflection module 3 comprises a motor connecting plate 31, a moveable offset assembly 32, a guiding rail 33, a reflective mirror housing 34, a translation plate 35, and a control motor 36.

The motor connecting plate 31 is connected to the housing 7 through bolt holes and fixed inside the housing 7. A guide rail 33 is fixedly installed on the motor connecting plate 31 in the X-axis direction through bearings and snap rings and connected to the control motor 36 and the moveable offset assembly 32 through threaded holes. The threaded hole at the other end of the control motor 36 is connected to the translation plate 35. The reflective mirror housing 34 is installed on the translation plate 35, and the reflective mirror housing 34 is also installed on the guiding rail 33.

The reflective mirror housing 34 of the deflection module 3 is equipped with a reflective lens placed at an angle of 45°.

The deflection module 32 mainly comprises a rotatable motor 321, a lens housing 322, an optical wedge snap ring 323, a first optical wedge 324, a second optical wedge 325, and an optical wedge snap ring 326.

The first optical wedge 324 and the second optical wedge 325 are arranged in parallel and are installed in the lens housing 322 through the optical wedge snap ring 322 and the optical wedge snap ring 236, wherein a wedge edge of the first optical wedge 324 is tangent to a wedge edge of the optical wedge snap ring 322, a wedge edge of the second optical wedge 325 is tangent to a wedge edge of the optical wedge snap ring 236, and the wedge edge of the first optical wedge 324 and the wedge edge of the second optical wedge 325 are parallel to each other; the lens housing 322 is fixed on the rotatable motor 321 and is coaxial with the rotatable motor 321. When the rotatable motor 321 rotates, it will drive the first optical wedge 324 and the second optical wedge 325 to rotate. Due to the characteristics of the parallel double optical wedges, the passing laser beam 1 will be offset along the X-axis.

The beam expansion module 4 mainly comprises a motor mounting frame 41, a small gear 42, a large gear 43, a driving motor 44, a gear mounting rod 45, a long crank 46, a short crank 47, a left limiting block 48, a movable lens housing 49, a high-precision horizontal guiding rail 490, a right limiting block 491, a fixed lens housing 492 having a lens received therein, a fixed lens housing 493 having a lens received therein.

The motor mounting frame 41 is fixed inside the housing 7 with screws and has a U-shaped, and the gear mounting rod 45 and the driving motor 44 are installed on it.

A large gear 43 is installed at an output end of the drive motor 44. The large gear 43 meshes with the small gear 42. The small gear 42 is fixed on the gear mounting rod 45. A long crank 46 is fixed on the gear mounting rod 45. The long crank 46 is hinged with one end of the short crank 47, and the other end of the short crank 47 is hinged with the movable lens housing 49. When the gear mounting rod 45 rotates, the movable lens housing 49 is driven by the cranks to move on the high-precision horizontal guiding rail 490. The high-precision horizontal guiding rail 490 is fixed on the housing 7, and has a left limiting block 48 and a right limiting block 491 at both ends to restrict the position. The limiting blocks are also fixed inside the housing 7, and the fixed lens housing 492 and the fixed lens housing 493 are both fixed inside the housing 7.

One end of the long crank 46 is connected to the gear mounting rod 45 to transmit a rotation of the driving motor 44 to the short crank 47, and the short crank 47 is hingedly connected to the movable lens housing 49 to drive the movable lens housing 49 to move back and forth. The gear mounting rod 45, the long crank 46, the short crank 47, and the movable lens housing 49 form a crank sliding mechanism, which converts the rotation of the driving motor 44 into a movement of the movable lens housing 49. In order to ensure the high-speed and high-precision of the reciprocating motion of the moving lens housing, the high-precision horizontal guiding rail 490 can effectively reduce the friction of the reciprocating motion and ensure the high speed of the motion.

The plane scanning module 5 comprises an X-motor 51, a motor positioning frame 52, a Y-motor 53, an X-reflector 55, and a Y-reflector 54.

The motor positioning frame 52 is fixed inside the housing 7. The X-motor 53 and the Y-motor 54 are fixed on the motor positioning frame 52 at 90° and at a certain distance. The X reflector is installed at an output end of the X-motor 53, the Y reflector 54 is installed on the Y-motor 53. When the motor rotates, the reflectors will be driven to rotate, causing the passing laser beam 1 to deflect in the XY planes.

A method of using the five-dimensional laser scanning processing device, comprising the following steps:
the laser beam 1 entering into the interior of the housing 7 along a direction parallel to the housing 7; entering into the deflection module 3 after the turning optical path module 2 deflects the laser beam 1 by 90°, deflecting the laser beam 1 by 90° again and entering the beam expansion module 4 in the same direction as the incident light, then entering the plane scanning module 6, and then passing through the focusing module 5 to achieve laser focusing;
keeping the initial positions of other components unchanged, controlling the X reflector 55 by the X motor 51 while controlling the Y reflector 54 by the Y-motor 53 so that the laser beam entering the plane scanning module 6 realizes scanning in the XY plane under the action of the X reflector 55 and the Y reflector 54.

The change in the Z dimension mainly comes from the beam expansion module 4. By installing a spherical lens in the movable lens housing 49, as the movable lens housing 49 reciprocates along the high-precision guiding rail 490, the laser beam finally converged by the focusing module 5 is caused to move up and down along the Z-axis.

The movable lens housing 49 is driven by the short crank 27. The motor mounting frame 41, the long crank 46, the short crank 47, and the movable lens housing 49 form a crank sliding mechanism, the long crank 46 drives the large gear 43 to rotate by the driving motor, and drives the small gear 42 to move through gear meshing. The small gear 42 drives the gear mounting rod 45 to rotate. Since the long crank 46 is installed on the gear mounting rod 45, it also drives the long crank 46 to start rotating at the same time.

The regulation of $\alpha$ and $\beta$ is the joint action of several modules. Due to the effect of the turning optical path module 2 and the deflection module 3, the laser beam 1 is deflected twice after entering the turning module 2, and then still enters the deflection module 3 along the Z-axis direction. The up and down movement along the X-axis of the reflective mirror housing causes the laser beam to deflect along the Z-axis by a certain amount, and then enter into the deflection module 3. Since the first optical wedge 324 and the second optical wedge 325 are placed parallel to each other, the laser beam is emitted parallel to the optical axis Z-axis. However, when the control motor 321 drives the first optical wedge 324 and the second optical wedge 325 to rotate together, the laser beam also starts to rotate around the Z-axis, and then the laser beam enters the beam expansion module 4 and the plane scanning module 6. According to the principle of deflection, the beam expansion module 4 and the plane scanning module 6 work together to produce corresponding deflection angles $\alpha$ and $\beta$ of the laser beam.

The advantageous effect of the present invention:

The present invention can adjust the changes of the laser beam in five dimensions or even multiple dimensions, thereby realizing the complex motion trajectory of the focused light spot in space.

When it is necessary to process certain complex microstructures, such as special-shaped holes, special-shaped grooves, etc., each module of the multi-dimensional laser processing head can be controlled, and the complex spatial trajectory of the light spot can be realized through the joint movement between modules to complete the processing of complex microstructures. Compared with the processing method combined with machine tools, this method is more efficient and faster.

The present invention directly controls the spatial multi-dimensional changes of the laser. On the basis of the original three-dimensional space of XYZ, two deflection angles $\alpha$ and $\beta$ are added to achieve changes in five-dimensional or even multi-dimensional space. The multi-dimensional changing ability of spatial beams is utilized to complete efficient and fine processing of complex structures.

DETAILED DESCRIPTION OF THE PREFERRED EMBODIMENT

Figure 1:
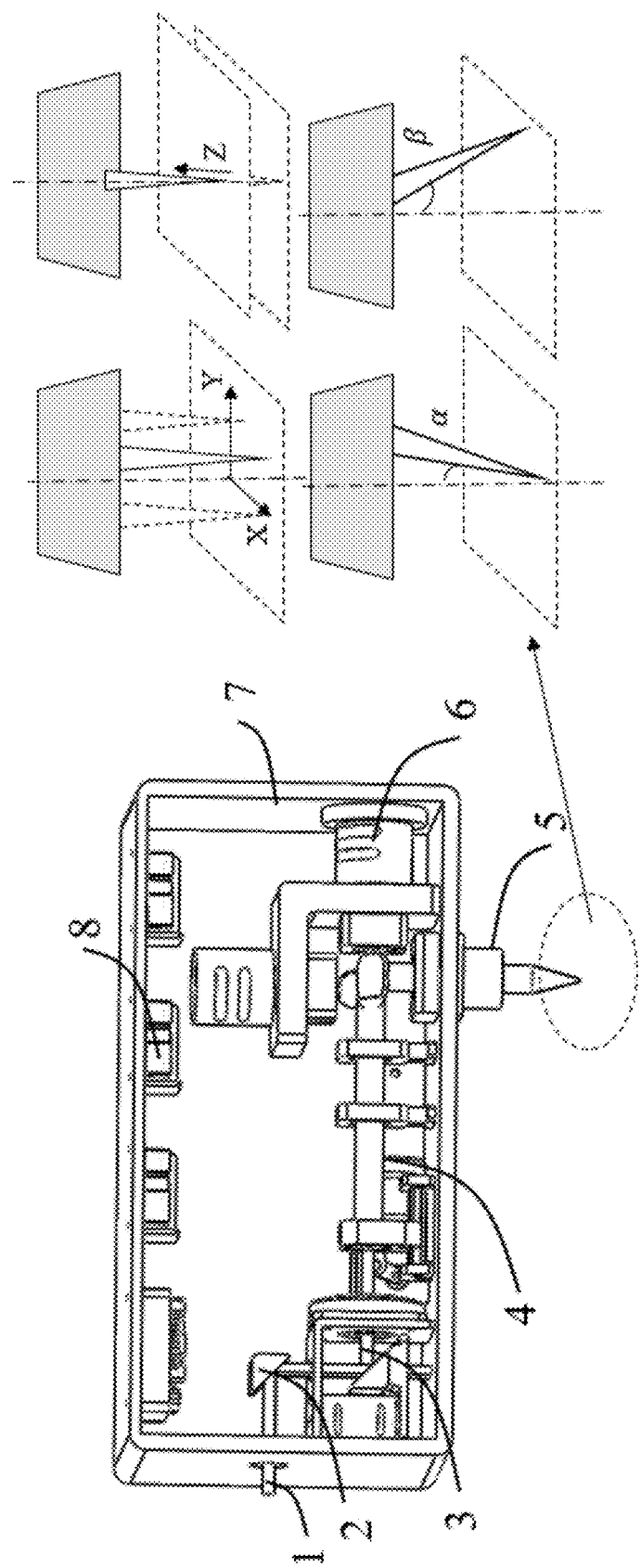
FIG. 1 is a schematic diagram of the present invention.

The present invention is further described in detail below with reference to the embodiments.

As shown in FIG. 1 to FIG. 5 of the drawings, a multi-dimensional laser scanning processing device is illustrated. The laser beam 1 enters the interior of the housing 7 along the horizontal direction through the light hole on the housing 7. First, it is deflected by 90° through the turning optical path module 2, causing the light to enter the deflection module 3. The deflection module 3 deflects the laser beam 1 by 90° again so that it enters the beam expansion module 4 along the horizontal direction. The beam expansion module 4 expands the beam radius of the laser beam 1 to a certain multiple, then enters the plane scanning module 6, and finally enters the focusing module 5 to converge into an ideal spot. The transmission process of the laser beam 1 in the housing 7 is controlled by the control system 8, and the changes of the laser beam in the five-dimensional space are realized by controlling the corresponding modules.

The laser beam 1 enters the interior of the housing 7 along the horizontal direction through the light hole on the housing 7. First, it is deflected by 90° through the turning optical path module 2, causing the light to enter the deflection module 3. The deflection module 3 deflects the laser beam 1 by 90° again so that it enters the beam expansion module 4 along the horizontal direction. The beam expansion module 4 expands the beam radius of the laser beam 1 to a certain multiple, then enters the plane scanning module 6, and finally enters the focusing module 5 to converge into an ideal spot. The transmission process of the laser beam 1 in the housing 7 is controlled by the control system 8, and the changes of the laser beam in the five-dimensional space are realized by controlling the corresponding modules.

In actual processing, the multi-dimensional laser processing head has the ability to change the light beam in multiple dimensions. Through the cooperation of each module, the changes of the laser in the XYZ plane and the two inclination angles α and β can be realized. Compared with traditional laser processing equipment, it has sufficient degrees of freedom to realize the trajectory changes of the beam in multi-dimensional space, does not require multi-axis CNC machine tool to control additional degrees of freedom, avoids the disadvantages of low accuracy and slow speed in machine tool processing, and has the full advantage of ultra-fast laser processing.

Figure 2:
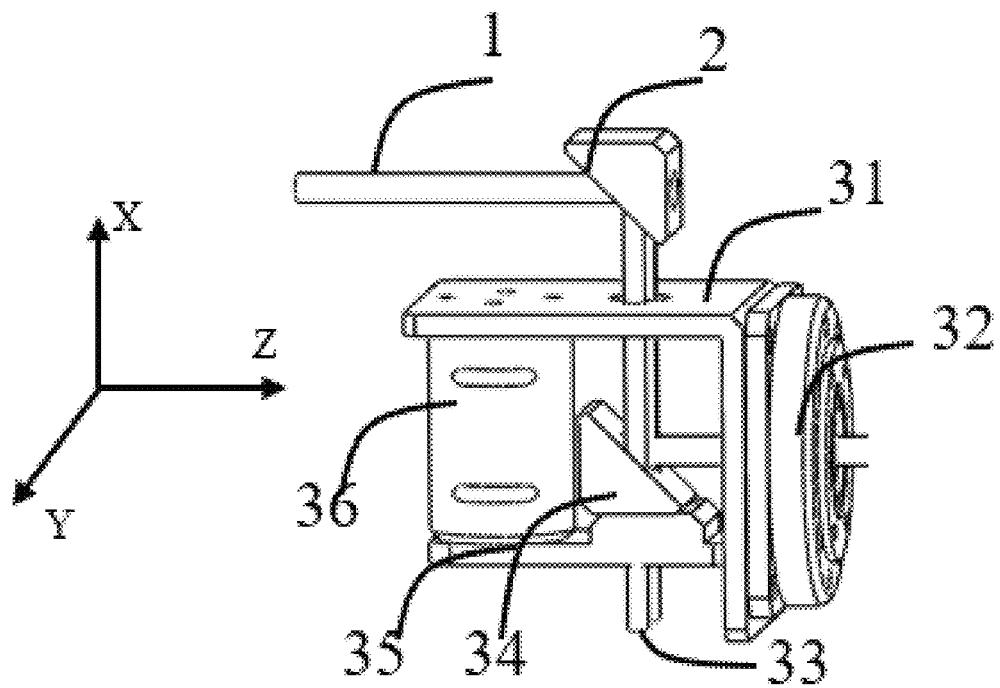
FIG. 2 is an exploded view of the beam deflection module.
Figure 3:
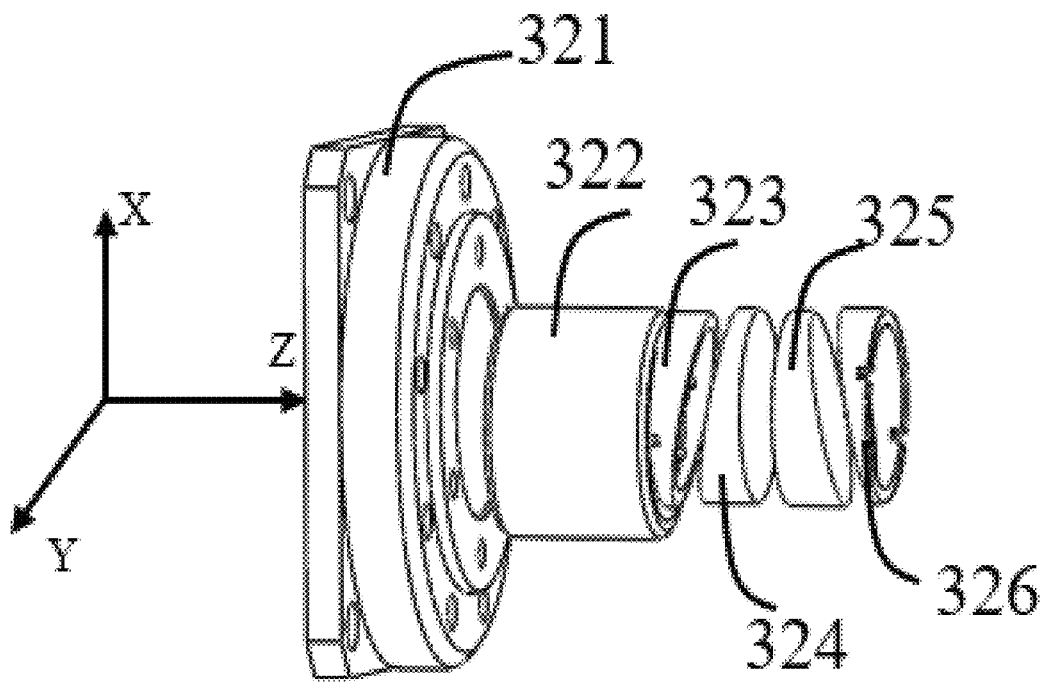
FIG. 3 is an exploded view of the moveable offset assembly of the beam deflection module.

As shown in FIG. 2 and FIG. 3 of the drawings, the deflection module 3 comprises a motor connecting plate 31, a moveable offset assembly 32, a guiding rail 33, a reflective mirror housing 34, a translation plate 35, and a control motor 36.

The motor connecting plate 31 is connected to the housing 7 through bolt holes and fixed inside the housing 7 into position. A guiding rail 33 is installed into position on the motor connecting plate 31 in the X-axis direction through bearings and snap rings and connected to the control motor 36 and the moveable offset assembly 32 through threaded holes. The threaded hole at the other end of the control motor 36 is connected to the translation plate 35. The reflective mirror housing 34 is installed on the translation plate 35, and the reflective mirror housing 34 is also installed on the guiding rail 33.

The reflective mirror housing 34 of the deflection module 3 is equipped with a reflective lens placed at an angle of 45°.

After passing through the turning optical path module 2, the laser beam 1 vertically enters the deflection module 3 along the negative X direction. The reflective mirror housing 34 of the deflection module 3 is equipped with a reflective lens placed at an angle of 45°. According to the characteristics of the reflector, the laser beam 1 is reflected into the beam expansion module 4 along the Z-axis direction. When the control motor 36 rotates, it drives the translation plate 35 to reciprocate along the X-axis. At the same time, the reflective mirror housing 34 and the translation plate 35 reciprocate along the guiding rail 34 along the X-axis. Therefore, the movement of the reflective lens in the reflective mirror housing 34 will cause the beam to deviate from the Z-axis by a certain distance and enter the deflection module 32.

The deflection module 32 mainly comprises a rotatable motor 321, a lens housing 322, an optical wedge snap ring 323, a first optical wedge 324, a second optical wedge 325, and an optical wedge snap ring 326.

The first optical wedge 324 and the second optical wedge 325 are arranged in parallel and are installed in the lens housing 322 through the optical wedge snap ring 322 and the optical wedge snap ring 236, wherein a wedge edge of the first optical wedge 324 is tangent to a wedge edge of the optical wedge snap ring 322, a wedge edge of the second optical wedge 325 is tangent to a wedge edge of the optical wedge snap ring 236, and the wedge edge of the first optical wedge 324 and the wedge edge of the second optical wedge 325 are parallel to each other; the lens housing 322 is fixed on the rotatable motor 321 and is coaxial with the rotatable motor 321. When the rotatable motor 321 rotates, it drives the first optical wedge 324 and the second optical wedge 325 to rotate. Due to the characteristics of the parallel double optical wedges, the passing laser beam 1 will be offset along the X-axis.

Figure 4:
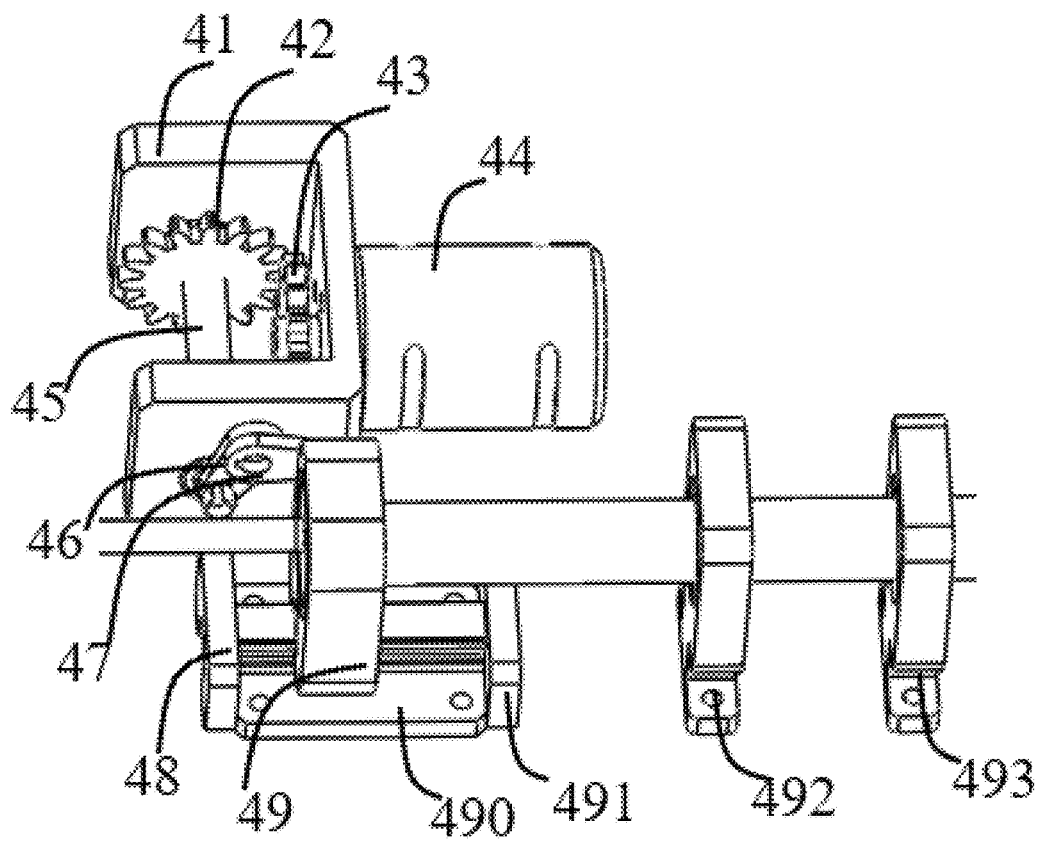
FIG. 4 is an exploded view of the beam expansion module.

As shown in FIG. 4, the beam expansion module 4 mainly comprises a motor mounting frame 41, a small gear 42, a large gear 43, a driving motor 44, a gear mounting rod 45, a long crank 46, a short crank 47, a left limiting block 48, a movable lens housing 49, a high-precision horizontal guiding rail 490, a right limiting block 491, a fixed lens housing 492, and a fixed lens housing 493. The lens housings 492 and 493 are arranged for receiving a lens therein.

The motor mounting frame 41 is fixed into position inside the housing 7 with screws and has a U-shaped, on which the gear mounting rod 45 and the driving motor 44 are installed. A large gear 43 is installed at an output end of the drive motor 44. The large gear 43 meshes with the small gear 42. The small gear 42 is fixed into position on the gear mounting rod 45. When the driving motor 44 rotates, the large gear 43 is driven to rotates. Based on the principle of gear meshing, the small gear 42 is driven to rotate, which then drives the gear mounting rod 45 to rotate. A long crank 46 is fixed on the gear mounting rod 45. The long crank 46 is hinged with one end of the short crank 47, and the other end of the short crank 47 is hinged with the movable lens housing 49. When the gear mounting rod 45 rotates, the movable lens housing 49 is driven by the cranks to move on the high-precision horizontal guiding rail 490. The high-precision horizontal guiding rail 490 is fixed into position on the housing 7, and has a left limiting block 48 and a right limiting block 491 at both ends to restrict the position. The limiting blocks are also fixed inside the housing 7, and the fixed lens housing 492 and the fixed lens housing 493 are both fixed into position inside the housing 7.

Figure 5:
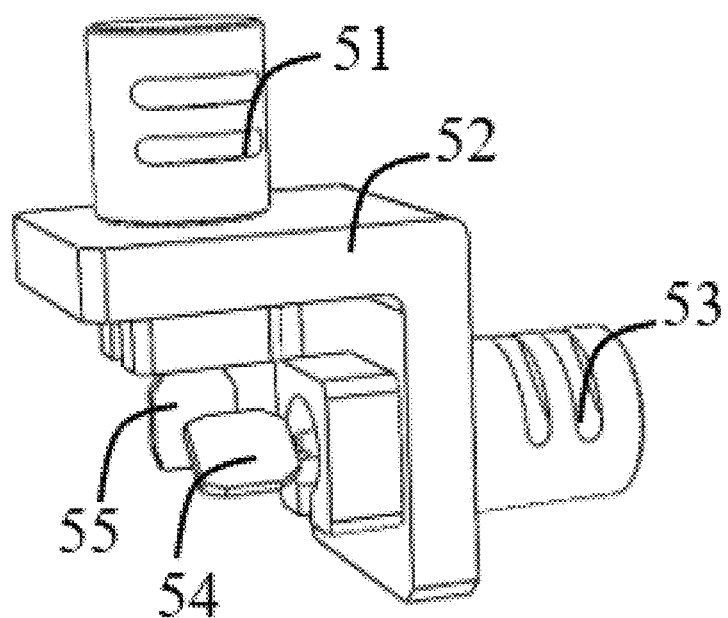
FIG. 5 is an exploded view of plane scanning module.

As shown in FIG. 5, the plane scanning module 5 comprises an X-motor 51, a motor positioning frame 52, a Y-motor 53, an X-reflector 55, and a Y-reflector 54.

The motor positioning frame 52 is fixed into position inside the housing 7. The X-motor 53 and the Y-motor 54 are fixed into position on the motor positioning frame 52 at 90° and at a certain distance. The X reflector is installed at an output end of the X-motor 53, the Y reflector 54 is installed on the Y-motor 53. When the motor rotates, the reflectors will be driven to rotate, causing the passing laser beam 1 to deflect in the XY planes.

The working principle of the present invention: the principle implemented by the five-dimensional laser scanning processing device is shown in FIG. 1. The laser beam 1 enters into the interior of the housing 7 along a direction parallel to the housing 7. After the turning optical path module 2 deflects the laser beam 1 by 90°, the laser beam enters the deflection module 3 and is deflected by 90° again, and then enters the beam expansion module 4 in the same direction as the incident light. After that, it enters the plane scanning module 6, and then pass through the focusing module 5 to achieve laser focusing.

By keeping the initial positions of other components unchanged, the X reflector 55 is controlled by the X motor 51 while the Y reflector 54 is controlled by the Y-motor 53 so that the laser beam entering the plane scanning module 6 realizes scanning in the XY plane under the action of the X reflector 55 and the Y reflector 54.

The change in the Z dimension mainly comes from the beam expansion module 4. As shown in FIG. 4, mainly by installing a spherical lens in the movable lens housing 49, as the movable lens housing 49 reciprocates along the high-precision guiding rail 490, the laser beam finally converged by the focusing module 5 is caused to move up and down along the Z-axis. Wherein the movable lens housing 49 is driven by the short crank 47. The motor mounting frame 41, the long crank 46, the short crank 47, and the movable lens housing 49 form a crank sliding mechanism. The long crank 46 drives the large gear 43 to rotate by the driving motor, and drives the small gear 42 to move through gear meshing. The small gear 42 drives the gear mounting rod 45 to rotate. Since the long crank 46 is installed on the gear mounting rod 45, it also drives the long crank 46 to start rotating at the same time.

The regulation of α and β is the joint action of several modules, wherein the major effect is caused by the turning optical path module 2 and the deflection module 3. As shown in FIG. 2, the laser beam 1 is deflected twice after entering the turning module 2, and then still enters the deflection module 3 along the Z-axis direction. The up and down movement along the X-axis of the reflective mirror housing 34 causes the laser beam to deflect along the Z-axis by a certain amount, and then enter into the deflection module 3. As shown in FIG. 3, since the first optical wedge 324 and the second optical wedge 325 are placed parallel to each other, the laser beam is emitted parallel to the optical axis Z-axis. However, when the control motor 321 drives the first optical wedge 324 and the second optical wedge 325 to rotate together, the laser beam also starts to rotate around the Z-axis, and then the laser beam enters the beam expansion module 4 and the plane scanning module 6. According to the principle of deflection, the beam expansion module 4 and the plane scanning module 6 work together to produce corresponding deflection angles α and β of the laser beam.

What is claimed is:

1. A five-dimensional laser scanning processing device, characterized in that, comprising: a laser emitting device, a turning optical path module (2), a deflection module (3), a beam expansion module (4), a plane scanning module (6) and a focusing module (5), wherein said laser emitting device is arranged to emit a laser beam (1), said beam expansion module (4) is arranged to expand a beam radius of the laser beam (1), which subsequently enters said plane scanning module (6), said plane scanning module (6) comprises two reflective mirrors relatively positioned at a preset angle, through a continuous deflection of said two reflective mirrors, a scanning of the laser beam in an XY plane is achieved, the laser beam passes through said plane scanning module (6) and finally enters said focusing module (5) to converge into an ideal spot;

wherein the laser beam (1) enters an interior of a housing (7) along a horizontal direction through a light hole on the housing (7), and said turning optical path module (2), said deflection module (3), said beam expansion module (4), said focusing module (5), and said plane scanning module (6) are installed inside said housing (7);

said turning optical path module (2) comprises a lens housing and a reflective lens, wherein said reflective lens is placed at an angle of 45° relatively to the horizontally entering laser beam (1), said lens housing not only can install said reflective lens, but also has a function of adjusting said reflective lens by ±2°, so said lens after installation can reflect the light beam and make it vertically incident on said deflection module (3);

said deflection module (3) comprises a motor connecting plate (31), a moveable offset assembly (32), a guiding rail (33), a reflective mirror housing (34), a translation plate (35), and a control motor (36);

said motor connecting plate (31) is connected to said housing (7) through bolt holes and is fixed into position inside said housing (7), said guide rail (33) is fixedly installed on said motor connecting plate (31) in an X-axis direction through bearings and snap rings and is connected to said control motor (36) and said moveable offset assembly through threaded holes, a threaded hole at another end of said control motor (36) is connected to said translation plate (35), said reflective mirror housing (34) is installed on said translation plate (35), and said reflective mirror housing (34) is also installed on said guiding rail (33);

said reflective mirror housing (34) of said deflection module (3) is equipped with a reflective mirror housing reflective lens placed at an angle of 45°;

said deflection module (32) comprises a rotatable motor (321), a lens housing (322), an optical wedge snap ring (323), a first optical wedge (324), a second optical wedge (325), and an optical wedge snap ring (326);

said first optical wedge (324) and said second optical wedge (325) are arranged in parallel and are installed in said lens housing (322) through said optical wedge snap ring (322) and said optical wedge snap ring (236) respectively, wherein a wedge edge of said first optical wedge (324) is tangent to a wedge edge of said optical wedge snap ring (322), a wedge edge of said second optical wedge (325) is tangent to a wedge edge of said optical wedge snap ring (236), and said wedge edge of said first optical wedge (324) and said wedge edge of said second optical wedge (325) are parallel to each other; said lens housing (322) is fixed on said rotatable motor (321) and is coaxial with said rotatable motor (321), when said rotatable motor (321) rotates, said first optical wedge (324) and said second optical wedge (325) are driven to rotate, due to the characteristics of parallel double optical wedges, the passing laser beam (1) is offset along the X-axis.

2. A method of use of a five-dimensional laser scanning processing device, wherein said five-dimensional laser scanning processing device comprises: a laser emitting device, a beam expansion module (4), a plane scanning module (6)

and a focusing module (5), wherein said laser emitting device is arranged to emit a laser beam (1), said beam expansion module (4) is arranged to expand a beam radius of the laser beam (1), which subsequently enters said plane scanning module (6), said plane scanning module (6) comprises two reflective mirrors relatively positioned at a preset angle, through a continuous deflection of said two reflective mirrors, a scanning of the laser beam in an XY plane is achieved, the laser beam passes through said plane scanning module (6) and finally enters said focusing module (5) to converge into an ideal spot, characterized in that, said method comprising the steps of:

the laser beam (1) entering into an interior of said housing (7) along a direction parallel to said housing (7); entering into said deflection module (3) after a turning optical path module (2) deflects the laser beam (1) by 90°, deflecting the laser beam (1) by 90° again and entering said beam expansion module (4) in the same direction as the incident light, then entering said plane scanning module (6), and then passing through said focusing module (5) to achieve laser focusing, keeping initial positions of other components unchanged, controlling an X reflector (55) by an X motor (51) while controlling an Y reflector (54) by an Y-motor (53) so that the laser beam entering said plane scanning module (6) realizes scanning in the X and Y planes under actions of said X reflector (55) and said Y reflector (54);

wherein a change in an Z dimension mainly comes from said beam expansion module (4), by installing a spherical lens in a movable lens housing (49), as said movable lens housing (49) reciprocates along a high-precision guiding rail (490), the laser beam finally passing is converged by said focusing module (5) and caused to move up and down along the Z-axis;

wherein said movable lens housing (49) is driven by a short crank (47), a motor mounting frame (41), a long crank (46), a short crank (47), and said movable lens housing (49) form a crank sliding mechanism, said long crank (46) is driven by said driving motor to drives a large gear (43) to rotate, and drives a small gear (42) to move through gear meshing, said small gear (42) drives a gear mounting rod (45) to rotate, since said long crank (46) is installed on said gear mounting rod (45), said long crank (46) is driven simultaneously to start rotating movement;

angles α and β is regulated by a combined action of several modules, due to the effect of said turning optical path module (2) and said deflection module (3), the laser beam (1) is deflected twice after entering said turning optical path module (2), and then still enters said deflection module (3) along the Z-axis direction; the up and down movement along the X-axis of said reflective mirror housing causes the laser beam to deflect along the Z-axis by a certain amount, and then to enter into said deflection module (3); since a first optical wedge (324) and a second optical wedge (325) are placed parallel to each other, the laser beam is emitted parallel to the optical axis Z-axis; however, when a rotatable motor (321) drives said first optical wedge (324) and said second optical wedge (325) to start rotating together, the laser beam also starts to rotate around the Z-axis, and then the laser beam enters said beam expansion module (4) and said plane scanning module (6), according to the principle of deflection, said beam expansion module (4) and said plane scanning module (6) work together to produce the corresponding angles α and β of the laser beam.

3. The method of use of said five-dimensional laser scanning processing device according to claim 2, wherein said turning optical path module (2) is arranged at one end of the laser beam (1) along a horizontal direction, said turning optical path module (2) is arranged to deflect the laser beam (1) by 90° before entering said deflection module (3), said deflection module (3) is arranged to deflect the laser beam (1) by 90° again so that it enters the beam expansion module (4) along the horizontal direction;

a change of the laser beam (1) in a five-dimensional space is realized by a combined action of said turning optical path module (2), said deflection module (3), said beam expansion module (4), said focusing module (5), and said plane scanning module (6), wherein a scanning of the XY plane is mainly achieved by a movement of said plane scanning module (6), a movement of a focus of a Z plane is mainly achieved by a combined action of said beam expansion module (4) and said focusing module (5), and an adjustment control of the angles α and β between a focused beam and an optical axis is achieved by a combined movement of multiple modules.

4. The method of use of said five-dimensional laser scanning processing device according to claim 2, wherein the laser beam (1) enters the interior of a housing (7) along a horizontal direction through a light hole on the housing (7), and said turning optical path module (2), said deflection module (3), said beam expansion module (4), said focusing module (5), and said plane scanning module (6) are installed inside said housing (7).

5. The method of use of said five-dimensional laser scanning processing device according to claim 4, wherein said turning optical path module (2) comprises a lens housing and a reflective lens, wherein said reflective lens is placed at an angle of 45° relatively to the horizontally entering laser beam (1), said lens housing not only can install said reflective lens, but also has a function of adjusting said reflective lens by ±2°, so said lens after installation can reflect the light beam and make it vertically incident on said deflection module (3).

6. The method of use of said five-dimensional laser scanning processing device according to claim 5, wherein said deflection module (3) comprises a motor connecting plate (31), a moveable offset assembly (32), a guiding rail (33), a reflective mirror housing (34), a translation plate (35), and a control motor (36);

said motor connecting plate (31) is connected to said housing (7) through bolt holes and is fixed into position inside said housing (7), said guide rail (33) is fixedly installed on said motor connecting plate (31) in an X-axis direction through bearings and snap rings and is connected to said control motor (36) and said moveable offset assembly (32) through threaded holes, a threaded hole at another end of said control motor (36) is connected to said translation plate (35), said reflective mirror housing (34) is installed on said translation plate (35), and said reflective mirror housing (34) is also installed on said guiding rail (33);

said reflective mirror housing (34) of said deflection module (3) is equipped with a reflective minor housing reflective lens placed at an angle of 45°.

7. The method of use of said five-dimensional laser scanning processing device according to claim 6, wherein said deflection module (32) comprises a rotatable motor (321), a lens housing (322), an optical wedge snap ring (323), said first optical wedge (324), said second optical wedge (325), and an optical wedge snap ring (326);

said first optical wedge (324) and said second optical wedge (325) are arranged in parallel and are installed in said lens housing (322) through said optical wedge snap ring (322) and said optical wedge snap ring (236) respectively, wherein a wedge edge of said first optical wedge (324) is tangent to a wedge edge of said optical wedge snap ring (322), a wedge edge of said second optical wedge (325) is tangent to a wedge edge of said optical wedge snap ring (236), and said wedge edge of said first optical wedge (324) and said wedge edge of said second optical wedge (325) are parallel to each other; said lens housing (322) is fixed on said rotatable motor (321) and is coaxial with said rotatable motor (321), when said rotatable motor (321) rotates, said first optical wedge (324) and said second optical wedge (325) are driven to rotate, due to the characteristics of parallel double optical wedges, the passing laser beam (1) is offset along the X-axis.

8. The method of use of said five-dimensional laser scanning processing device according to claim 2, said beam expansion module (4) comprises said motor mounting frame (41), said small gear (42), said large gear (43), said driving motor (44), said gear mounting rod (45), said long crank (46), said short crank (47), a left limiting block (48), said movable lens housing (49), said high-precision horizontal guiding rail (490), a right limiting block (491), a fixed lens housing (492), a fixed lens housing (493);

said motor mounting frame (41) is mounted inside said housing (7) with screws and has a U-shaped structure, and said gear mounting rod (45) and said driving motor (44) are installed on said motor mounting frame (41); said large gear (43) is installed at an output end of said driving motor (44), said large gear (43) meshes with said small gear (42), said small gear (42) is fixed on said gear mounting rod (45), said long crank (46) is fixed on said gear mounting rod (45), said long crank (46) is hinged with one end of said short crank (47), and another end of said short crank (47) is hinged with said movable lens housing (49), when said gear mounting rod (45) rotates, said movable lens housing (49) is driven by said cranks to move on said high-precision horizontal guiding rail (490), said high-precision horizontal guiding rail (490) is fixed on said housing (7), and has a left limiting block (48) and a right limiting block (491) at both ends to restrict the position, said limiting blocks are also fixed inside said housing (7), and said fixed lens housing (492) and said fixed lens housing (493) are both fixed inside said housing (7).

9. The method of use of said five-dimensional laser scanning processing device according to claim 8, wherein one end of said long crank (46) is connected to said gear mounting rod (45) to transmit a rotation of said driving motor (44) to said short crank (47), and said short crank (47) is hinged to said movable lens housing (49) to drive said movable lens housing (49) to move back and forth, said gear mounting rod (45), said long crank (46), said short crank (47), and said movable lens housing (49) form a crank sliding mechanism, which converts a rotation of said driving motor (44) into a movement of said movable lens housing (49).

10. The method of use of said five-dimensional laser scanning processing device according to claim 2, wherein said plane scanning module (5) comprises said X-motor (51), a motor positioning frame (52), said Y-motor (53), said X-reflector (55), and said Y-reflector (54), said motor positioning frame (52) is fixed inside said housing (7), said X-motor (53) and said Y-motor (54) are fixed on said motor positioning frame (52) at 90° and at a certain distance, said X reflector is installed at an output end of said X-motor (53), said Y reflector (54) is installed on said Y-motor (53), when said motor rotates, said reflectors are driven to rotate, causing the passing laser beam (1) to deflect in X and Y planes.

* * * * *